United States Patent [19]

Crall

[11] 4,138,976

[45] Feb. 13, 1979

[54] ENGINE TIMING SYSTEM WITH AUTOMATIC SELECTIVE UTILIZATION OF FIRST AND SECOND SIGNALS

[75] Inventor: Frederick W. Crall, Farmington, Mich.

[73] Assignee: Chrysler Corporation, Highland Park, Mich.

[21] Appl. No.: 588,278

[22] Filed: Jun. 19, 1975

[51] Int. Cl.² ............................................. F02P 5/04
[52] U.S. Cl. .............................. 123/117 R; 123/148 E
[58] Field of Search ..................... 123/117 R, 146.5 A, 123/148 MCD, 148 E, 179 BG

[56] References Cited

U.S. PATENT DOCUMENTS

| | | | |
|---|---|---|---|
| 2,677,946 | 5/1954 | Purdy | 123/117 R |
| 3,464,397 | 9/1969 | Burson | 123/148 MCD |
| 3,570,460 | 3/1971 | Rabos | 123/32 EA |
| 3,699,932 | 10/1972 | Aono et al. | 123/32 EA |
| 3,800,757 | 4/1974 | Finch | 123/117 R |
| 3,867,916 | 2/1975 | Bigalke | 123/179 BG |
| 3,874,349 | 4/1975 | Fitzner | 123/117 R |
| 3,880,133 | 4/1975 | Katsumata | 123/148 MCD |
| 3,910,243 | 10/1975 | Bou et al. | 123/148 E |

Primary Examiner—Charles J. Myhre
Assistant Examiner—R. A. Nell
Attorney, Agent, or Firm—Baldwin & Newtson

[57] ABSTRACT

An ignition system for an internal combustion engine comprises a distributor containing a pair of magnetic pick-up devices each of which generates signals at a frequency representative of engine speed. One pick-up is used normally during starting of the engine to fire the engine spark plugs, and the other pick-up during running. An automatic transfer circuit is provided to transfer control from the first, or start, pick-up to the second, or run, pick-up when the engine begins to run under its own power and accelerate from cranking speed. Should a condition occur indicative of a lack of signals from the run pick-up above a predetermined minimum frequency, the transfer circuit transfers control of ignition firing back to the start pick-up.

13 Claims, 5 Drawing Figures

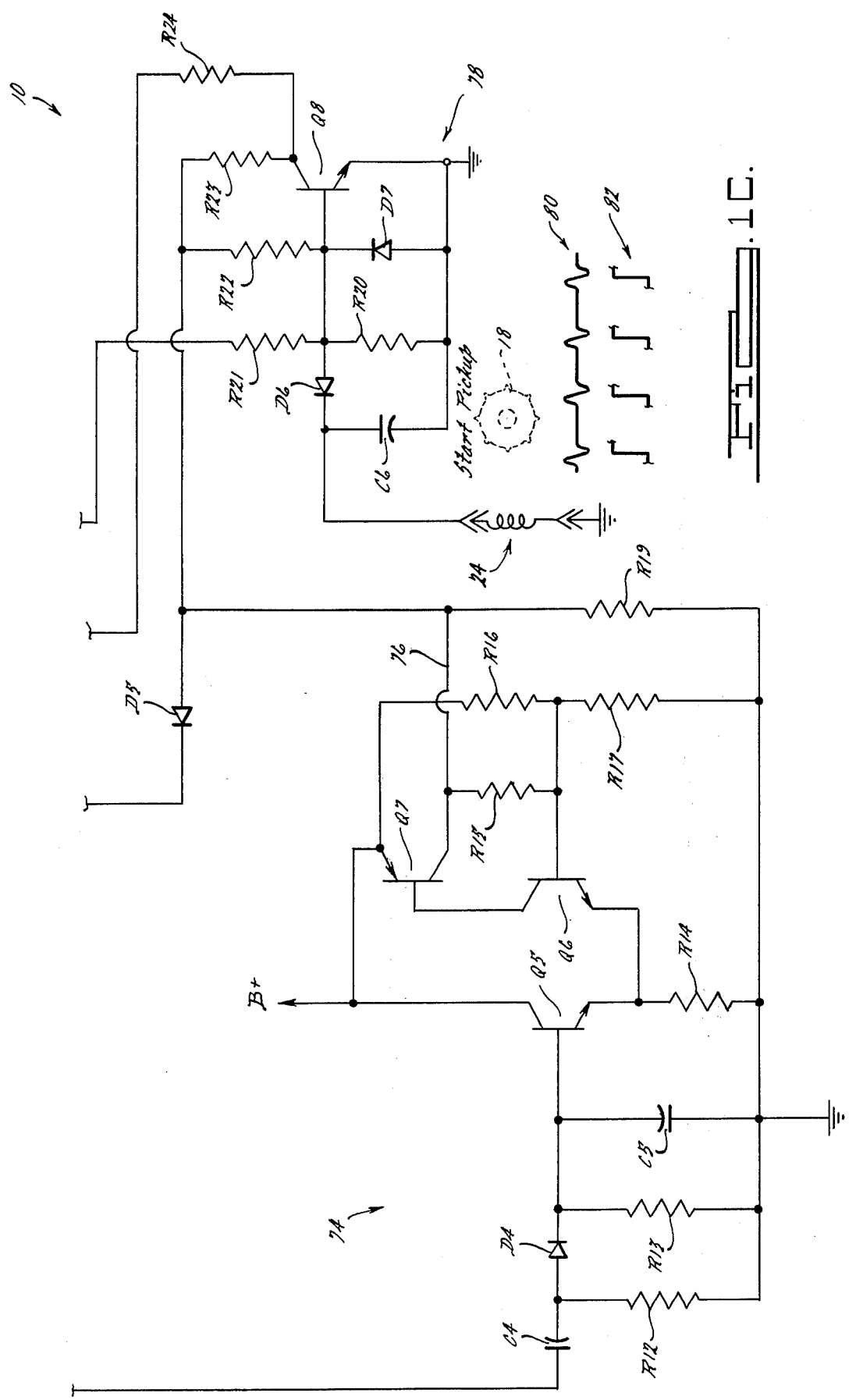

ENGINE TIMING SYSTEM WITH AUTOMATIC SELECTIVE UTILIZATION OF FIRST AND SECOND SIGNALS

CROSS REFERENCE TO RELATED APPLICATIONS

F. W. Crall, L. W. Tomczak, L. A. Caron, "Circuit for Generating a Sawtooth Engine Crank Angle Signal and an Analog Engine Speed Signal", filed Jan. 30, 1975, Ser. No. 545,274; F. W. Crall, "Noise Immune Reset Circuit for Resetting the Integrator of an Electronic Engine Spark Timing Controller", filed Jan. 30, 1975, Ser. No. 545,275; both incorporated herein by reference.

BACKGROUND AND SUMMARY OF THE INVENTION

This invention relates to ignition systems for internal combustion engines and more particularly relates to an electronic ignition system utilizing a pair of magnetic pick-ups wherein utilization of the pick-ups for ignition firing is selectively controlled.

The present invention is directed toward an improved ignition system wherein automatic transfer is provided between a pair of magnetic pick-ups. One of the pick-ups, referred to as the start pick-up, normally controls ignition firing when the engine is being cranked. When the engine comes under its own power, control automatically transfers to the run pick-up so that the latter controls ignition firing while the engine is running. Should a condition occur indicative of lack of signals from the run pick-up above a predetermined minimum frequency, then control of ignition firing transfers back to the start pick-up. An important benefit of the invention is that should a failure occur in the run pick-up and/or associated circuitry, the ignition system can continue to operate from the start pick-up. The system is especially useful in conjunction with an electronic spark timing controller.

Additional features of the invention will be seen in the ensuing description and claims which are to be considered in conjunction with the accompanying drawings illustrating a preferred embodiment of the present invention according to the best mode presently contemplated in carrying out the invention.

BRIEF DESCRIPTION OF THE DRAWINGS

FIGS. 1A, 1B and 1C should be considered together and constitute an electrical schematic diagram of an ignition system embodying principles of the present invention.

DESCRIPTION OF THE PREFERRED EMBODIMENT

Figure 1A:
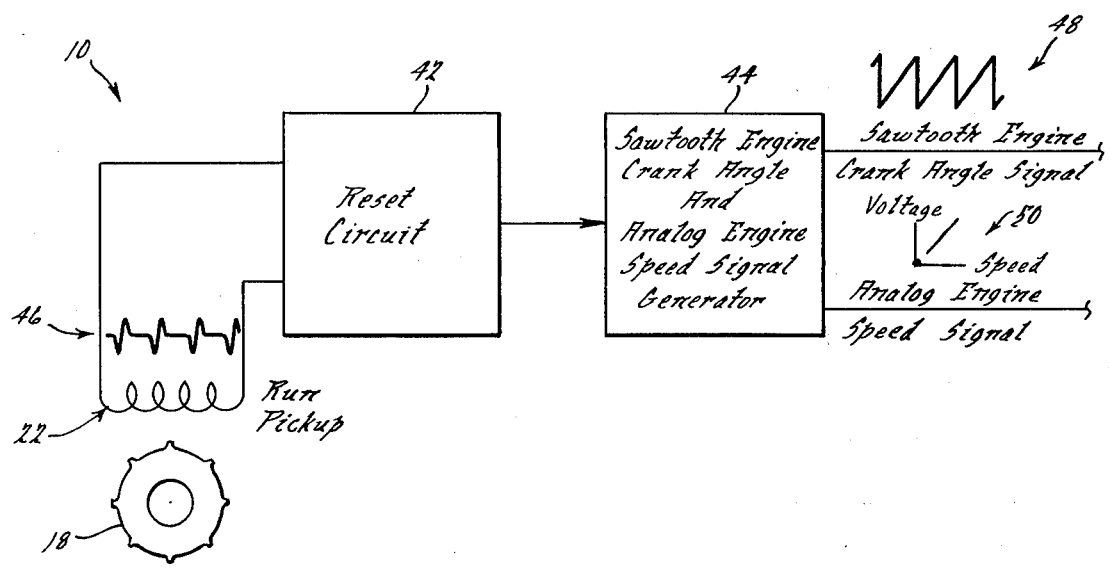
Figure 2:
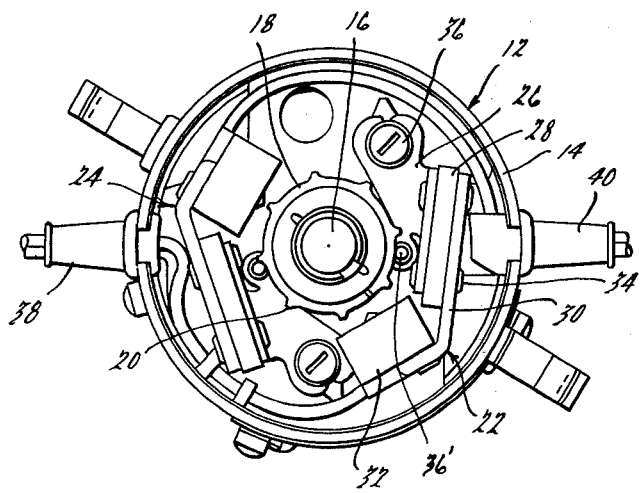
FIG. 2 is a plan view of a distributor used in the present invention with the distributor cap and rotor removed therefrom.
Figure 3:
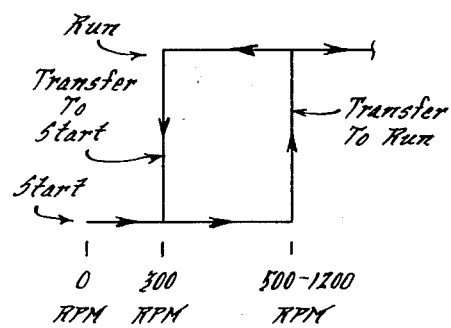
FIG. 3 is a graph plot useful in explaining the operation of the system of the present invention.
Figure 1B:
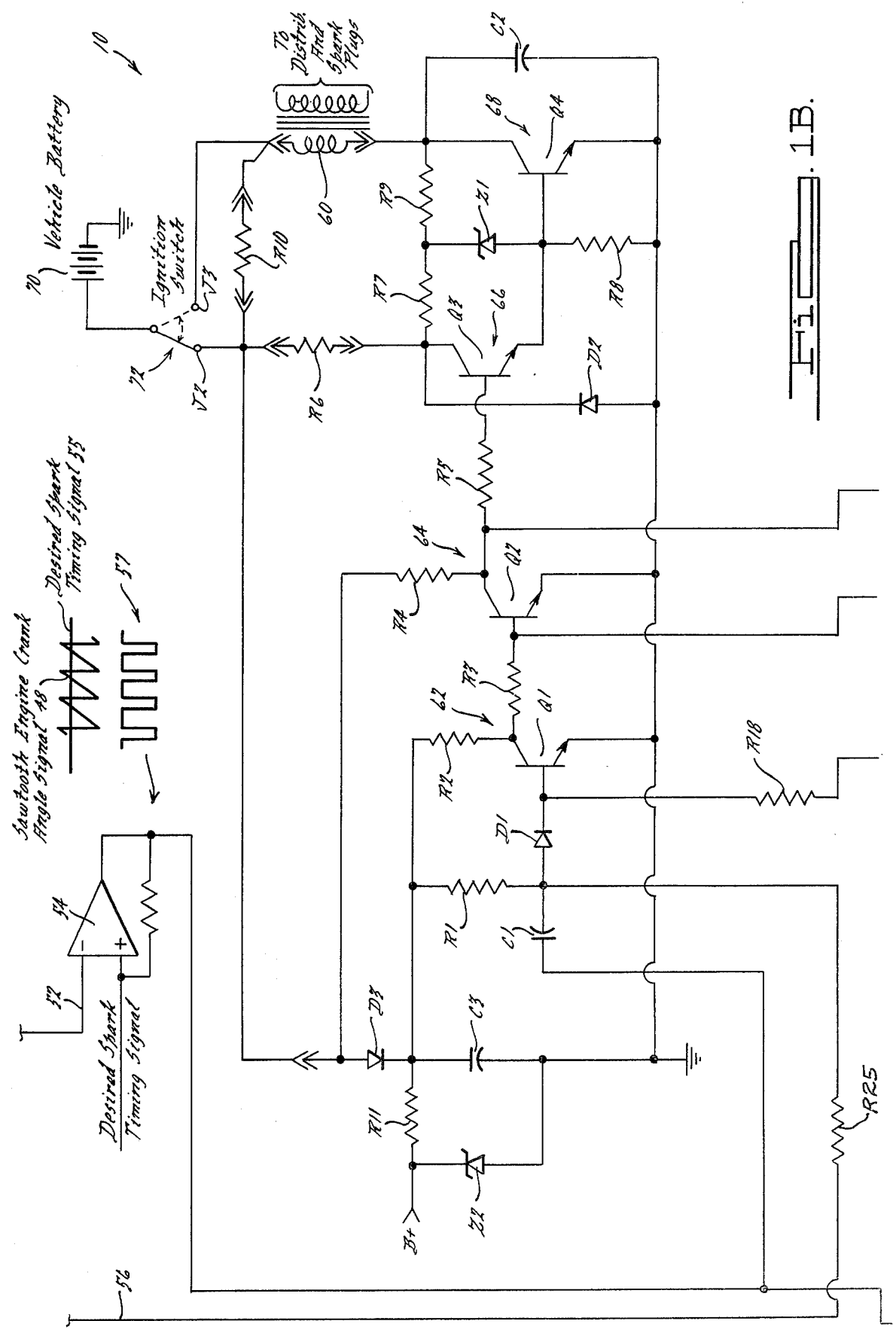

FIGS. 1A, 1B and 1C illustrate an ignition system 10 embodying principles of the present invention. As noted above, the present embodiment utilizes a dual pick-up distributor, a preferred embodiment of which is shown in FIG. 2. Briefly, the system provides one pick-up in the distributor which is used normally for starting the engine and a second pick-up used during running once the engine has started. Each pick-up provides a signal at a frequency proportional to engine speed. FIG. 3 graphically illustrates the manner by which the two pick-ups, referred to respectively as the start pick-up and the run pick-up, control ignition firing. When the engine is cranked by the usual starting motor, the start pick-up supplies the signals utilized to cause the spark plugs to fire. When the engine begins to run under its own power and accelerate from cranking speed, the ignition system, pursuant to principles of the prsent invention, tranfers control of the ignition firing from the start pick-up to the run pick-up. Transfer occurs at an engine speed above the customary engine cranking speed. So long as the engine continues to run, the ignition firing is controlled by the run pick-up until such a time as the engine is shut down. However, during running, should a condition occur indicative of a lack of signals from the run pick-up above a predetermined minimum frequency, then control of ignition timing transfers back to the start pick-up. This predetermined frequency is set somewhat below engine idle speed. An important benefit of this arrangement is that should a failure occur in the run pick-up and/or associated circuitry, the ignition system continues to operate from the start pick-up.

Considering now FIG. 2 in greater detail, a distributor 12 used with the present invention, comprises a housing 14 affixed to the engine in the usual manner. A distributor shaft 16 rotates within housing 14 and is driven from the engine in the usual manner. Affixed to distributor shaft 16 within housing 14 is a toothed reluctor wheel 18. Reluctor wheel 18 comprises a number of peripheral teeth 20 equal to the number of cylinders in the engine, the teeth being uniformly spaced. For example, the illustrated wheel 18 contains eight teeth 20 and is used with an eight-cylinder engine. Also, mounted within housing 14 adjacent reluctor wheel 18, are two magnetic pick-up devices 22 and 24. Pick-up 22 is the run pick-up referred to above while pick-up 24 is the start pick-up. The two pick-ups are virtually identical and hence a detailed description of one applies to both. Pick-up 22 comprises a mounting bracket 26, a permanent magnet 28, a pole piece 30 and a pick-up coil 32. Magnet 28 is sandwiched between an unstanding flange of bracket 26 and one leg of pole piece 30, the three elements being held together by rivets 34. Coil 32 mounts on the other leg of pole piece 30 and the axis thereof lies generally in a radial plane relative to the distributor housing 14. The base of mounting bracket 26 attaches to a transverse plate in the housing by means of an attaching screw 36 and a rivet 36'. This arrangement provides a magnetic circuit path from magnet 28, through pole piece 30, coil 32, the air gap between the coil 32 and reluctor wheel 18, reluctor wheel 18, the air gap between reluctor wheel 18 and mounting bracket 26 and through mounting bracket 26 back to magnet 28. Normally the air gap dimension between reluctor wheel 18 and mounting bracket 26 is essentially constant. However, the air gap dimension between coil 32 and reluctor wheel 18 varies considerably as teeth 20 sweep past coil 32. Because of this change in air gap there is induced a voltage signal in coil 32 each time a tooth 20 sweeps past coil 32. The occurrence of this signal indicates the angular position of reluctor wheel 18 and hence provides an indication of engine crank angle position. The frequency of the signals indicates the angular velocity of the reluctor wheel and hence also engine speed. Where the reluctor wheel is driven at an angular velocity equal to one-half the angular velocity of the engine crankshaft, the 45° angular distance between the teeth 20 is equivalent to 90° of engine crankshaft rotation. The pick-up is adjusted at manufacture by pivoting about rivet 36' and tightening screw 36 when the desired setting is attained. The setting can be accomplished by measuring the pick-up output for a given distributor shift rpm. From consideration of FIG. 2, the reader will note that the two pick-up coils are located such that the signals from the two pick-ups will be out of phase with respect to each other, although both will have the same frequency. By way of example, the start pick-up 24 is located such that it gives a signal at 10° before engine top dead center crankshaft and the run pick-up such that it gives a signal at 50° engine crankshaft ahead of the start signal.

Considering now FIGS. 1A, 1B and 1C in greater detail, and first turning to FIG. 1A, run pick-up 22 has its coil electrically connected via its lead wires with a reset circuit 42. Reset circuit 42 is of the type disclosed in the above cross-referenced patent application Ser. No. 545,275. Reset circuit 42 in turn couples with a sawtooth engine crank angle and analog engine speed signal generator circuit 44 which is of the type disclosed in the above cross-referenced U.S. patent application Ser. No. 545,274. The output waveform of run pick-up 22 is illustrated at 46 and comprises a series of bipolar pulses which are spaced apart 90° engine crank angle, and are at a frequency proportional to engine speed. Briefly, pick-up 22 and circuits 42 and 44 develop a sawtooth engine crank angle signal 48 and an analog engine speed signal 50. The sawtooth engine crank angle signal 48 comprises a train of individual sawtooth pulses which are regulated by the circuit to always develop a constant maximum peak amplitude regardless of engine speed and wherein the width of each sawtooth pulse always represents 90° of engine crank angle. The analog engine speed signal 50 is an analog voltage which is a function of engine speed as monitored by the frequency of the pulses in waveform 46. The two signals 48 and 50 are supplied to other portions of the circuitry shown in FIGS. 1B and 1C.

Considering now FIG. 1B, the sawtooth engine crank angle signal is supplied via a line 52 to one input of a comparator circuit 54 and the engine analog speed signal is supplied via a line 56 to one stage of the ignition control circuitry. (The use of the analog engine speed signal will be explained later.) The other input of comparator 54 receives a desired spark timing signal 55 which is an analog signal whose magnitude is representative of the engine crank angle at which spark ignition is desired. The magnitude of the timing signal is controlled in accordance with engine operating parameters to attain optimum engine performance. An example of a system which accomplishes this is disclosed in the copending application of Gordon W. Fenn, Ser. No. 570,671 filed Apr. 25, 1975 assigned to the same assignee of the present application. The comparator output waveform is shown at 57. At the beginning of each sawtooth pulse, the output of comparator 54 switches from low to high. When the sawtooth achieves coincidence with the desired spark timing signal, the comparator output switches from high to low and this causes an ignition spark to be delivered by the ignition system to the appropriate cylinder whenever the run pick-up, as opposed to the start pick-up, has control over the ignition firing. Because the desired spark timing signal is controlled by selected engine operating parameters, the engine crank angle at which ignition occurs is similarly controlled. The output signal waveform 57 of comparator 54 is electrically coupled with an electronic ignition circuit having a plurality of electronic ignition control circuit stages. These are an anti-dwell stage 62, a predriver stage 64, a driver stage 66, and an output stage 68. As will be explained later, the start pick-up is also coupled with the electronic ignition circuit and an automatic transfer circuit determines which pick-up controls ignition firing.

Anti-dwell stage 62 comprises an NPN transistor Q1, a capacitor C1, a diode D1 and three resistors R1, R2 and R25 connected as shown. Predriver stage 64 comprises an NPN transistor Q2 and a pair of resistors R3 and R4. Driver stage 66 comprises an NPN transistor Q3, a diode D2 and resistors R5, R6 and R8. Output stage 68 comprises an NPN transistor Q4, a Zener diode Z1, a capacitor C2 and resistors R7, R9 and R10 in addition to the primary winding 60 of the ignition coil. The secondary of the ignition coil is connected to the distributor and spark plugs in the usual manner.

Power for the stages is supplied from the vehicle battery 70 through the usual ignition switch 72. The battery terminal of the ignition switch connects directly to the positive battery terminal. The J2 terminal of the ignition switch connects as illustrated to the predriver, driver and output stages. The J3 terminal connects directly to one side of primary winding 60. Additionally, the J2 terminal connects to a regulated power supply comprising a Zener diode Z2, a capacitor C3, a resistor R11 and a diode D3 to develop a regulated voltage of B+ volts. The B+ regulated voltage is supplied to additional circuitry shown in FIG. 1C. The voltage across capacitor C3 is supplied to anti-dwell stage 62.

The operation of the circuits thus far described can now be explained without the need to consider the remainder of the circuits shown in FIG. 1C. The output signal waveform 57 of comparator 54 is applied through capacitor C1 and diode D1 to the base of transistor Q1 in anti-dwell stage 62. Absent the application of waveform 57 thereto, anti-dwell stage 62 assumes a condition wherein transistor Q1 is conducting. The application of waveform 57 to this stage causes transistor Q1 to be switched into non-conduction for a limited period in response to each negative going transition in waveform 57. By supplying the analog engine speed signal through resistor R25 to the junction of resistor R1, capacitor C1 and Diode D1, the duration for which transistor Q1 is switched into non-conduction becomes a function of engine speed. Specifically, the duration for which transistor Q1 is non-conductive decreases for engine speeds exceeding a predetermined speed. This yields an anti-dwell feature which is advantageous to optimum firing of the ignition system.

Predriver stage 64 monitors the collector voltage of transistor Q1. The conductivity of transistor Q2 is inverse to the conductivity of transistor Q1. Hence the voltage at the collector of transistor Q2 will exhibit a waveform inversely tracking the collector voltage of transistor Q1.

The voltage waveform at the collector of transistor Q2 is applied via resistor R5 to the base of transistor Q3 in driver stage 66. The configuration of driver stage 66 is such that when the collector voltage at transistor Q2 is high, transistor Q3 is conducting and when the voltage at the collector of transistor Q2 is low, transistor Q3 is non-conducting.

Output stage 68 is driven by transistor Q3. When transistor Q3 is conducting, base current drive for transistor Q4 energizes the latter for conduction, and when transistor Q3 does not conduct the base drive for transistor Q4 is cut off. As can be appreciated, a switching of transistor Q4 into and out of conduction controls primary current through the primary winding 60 of the ignition coil. When transistor Q4 conducts, charging current flows through resistor R10 and the primary winding 60 thereby charging the ignition coil. When transistor Q4 switches into non-conduction in response to a negative going transition in waveform 57, the interruption of primary current in the primary winding induces a voltage in the ignition coil secondary which is delivered via the distributor to the appropriate spark plug to be fired. The variable anti-dwell characteristic afford by the circuit arrangement permits the coil to be more uniformly charged over the engine speed range. At high engine speeds less energy is dissipated from the ignition coil per cycle and at lower speeds an adequate arc is developed for minimum vehicle exhaust emissions.

The output of comparator 54 is also supplied to an automatic transfer circuit 74 in FIG. 1C. Circuit 74 comprises an edge responsive input circuit composed of a pair of resistors R12 and R13, a pair of capacitors C4 and C5, and a diode D4. The circuit also includes a pair of NPN transistors Q5 and Q6 connected as a differential pair with a common emitter resistor R14, a PNP transistor Q7 and three resistors R15, R16 and R17. The output of circuit 74 is taken at a line 76 which connects through a diode D5 and a resistor R18 back to anti-dwell stage 62 and which also connects to a start pick-up input stage 78 associated with start pick-up 24. The start pick-up stage 78 comprises an NPN transistor Q8, a capacitor C6, a pair of diodes D6 and D7 and a plurality of six resistors R19, R20, R21, R22, R23 and R24.

The transfer circuit 74 operates to permit start pick-up 24 to control ignition firing during starting and to transfer control to the run pick-up once the engine has started. Therefore, when the driver attempts to start the engine by operating ignition switch 72, contact is first made with the J2 terminal which energizes the power supply providing the B+ regulated voltage. The construction of circuit 74 is such that upon energization of the B+ regulated supply, the voltage dividing effect of resistors R16 and R17 provides a drive to the base of transistor Q6 causing the latter to immediately switch into conduction. Because the emitter-collector circuit of transistor Q6 drives the base of transistor Q7, this latter transistor also switches into conduction. When this happens the regulated B+ supply voltage, minus the emitter-collector drop across transistor Q7, is delivered via line 76 to start input stage 78 and via diode D5 and resistor R18 to the base of transistor Q1 in anti-dwell stage 62. The energization of start pick-up stage 78 permits the start pick-up 24 to control the ignition firing during cranking. The application of the signal through diode D5 and resistor R18 holds transistor Q1 in conduction so that the output of comparator 54 is prevented from controlling the ignition firing.

As the driver now further actuates the ignition switch to energize the starting motor via the start relay circuit (not shown) the engine is cranked to cause both start pick-up 24 and run pick-up 22 to generate signals. However, only the signals from the start pick-up control ignition firing. Start pick-up 24 causes ignition firing in the following fashion. The voltage waveform induced in the start pick-up coil by reluctor wheel 18 is illustrated at 80 in FIG. 1C. The waveform is similar to the waveform developed by run pick-up 22; however, the phase polarity of the bipolar pulses is reversed. Absent waveform 80, transistor Q8 is biased for conduction. As each pulse of waveform 80 occurs, transistor Q8 switches to nonconduction as each pulse of waveform 80 passes through zero volts heading toward its maximum negative value. The switching of transistor Q8 into nonconduction creates a voltage rise at the collector thereof which is indicated at 82. Each voltage rise at the collector of transistor Q8 causes transistor Q2 to be switched into conduction and in turn transistors Q3 and Q4 switch into nonconduction, thereby causing the ignition coil primary current to be interrupted and a spark to be delivered to one of the engine spark plugs. The diode D6 provides the zero crossing switching of transistor Q8 and is selected such that the junction characteristic thereof matches the junction characteristic of the base-emitter junction of transistor Q8. This provides temperature compensation insuring the firing on zero crossing. During cranking the battery voltage drops appreciably and this similarly effects the voltage supply for the electronic circuits, however, the circuit operates successfully in spite of the reduced supply level. Moreover, at slow cranking speeds the waveforms contain a large amount of noise and distortion. Thus, it should be appreciated that the waveforms are generally illustrative rather than representing specific conditions existing in an operating system. By providing diodes D7 and D6, the maximum negative voltage developed by start pick-up 24 is limited to the two diode junction drop. The start pick-up provides a fixed engine crank angle at which spark ignition occurs during starting and as noted earlier this is illustratively 10° advance from engine top dead center. It should be remembered that during cranking the run pick-up is causing waveform 57 to be applied to both anti-dwell stage 62 and circuit 74 but that it is prevented from controlling ignition firing because circuit 74 is holding transistor Q1 in conduction. Also during cranking the D.C. supply voltage for the circuitry is delivered through resistor R10 since the J2 contact of the ignition switch is not made.

Once the engine begins to run under its own power and to accelerate from cranking speed, the increase in frequency of the positive-going transitions in waveform 57 reaches a point where the voltage on capacitor C5 becomes sufficiently large to switch transistor Q5 into conduction. When this occurs the voltage at the emitter of transistors Q5 and Q6 begins to rise and this renders transistor Q6 nonconductive. With transistor Q6 nonconductive, transistor Q7 also becomes nonconductive, thereby removing the energizing potential from line 76. Accordingly, the start pick-up stage 78 is de-energized and the anti-dwell stage 62 is permitted to be controlled by the comparator output signal 57. Hence, the run pick-up now effectively gains control of ignition firing. So long as the comparator output supplies an output waveform 57 exceeding a predetermined minimum frequency, the run pick-up retains control.

The frequency at which control transfers to the run pick-up is determined by the values of circuit components. Capacitor C4 and resistor R12 are responsive to the rise time of the comparator. Resistor R13 bleeds capacitor C5 when the comparator output is low. Thus, as frequency increases the voltage across capacitor C5 increases. Gradually a point is reached when the base-emitter of transistor Q5 becomes forward, biased; however, the emitter voltage of the two transistors is also a factor and this depends upon the effect of the resistors R15, R16 and R17 associated with the base circuit of transistor Q6. During starting, the base voltage at transistor Q6 is determined by the voltage dividing action of resistors R15, R16 and R17. This means that because Q7 is conducting R15 is essentially shunting R16 and the base voltage at Q6 is higher than it would be were Q7 not conducting. Thus, this circuit condition determines the frequency at which control transfers to the run pick-up. However, once control transfers to the run pick-up transistor Q7 becomes non-conducting and the base voltage at transistor Q6 is determined solely by resistors R16 and R17. Now, when the frequency decreases, a lower emitter voltage at transistors Q5 and Q6 is required before transistor Q6 can again conduct. Thus, it will be appreciated that this manner of operation achieves the switching hysteresis that is shown in FIG. 3. The advantage of this arrangement is that in the event of failure in the run pick-up or associated circuitry preceding the output of comparator 54, the engine can still be operated and successfully driven from the start pick-up. This is particularly advantageous in promoting safety and driver convenience. Resistors R19 and R24 are beneficial in adding noise-immunity to the circuit. Resistor R21 provides positive feedback for transistor Q8 so that the two transistors Q8 and Q2 operate effectively as a Schmitt trigger configuration. This improves low speed performance of the circuit. Moreover, resistor R21 provides temperature compensation by monitoring the combined base-emitter voltages of transistors Q3 and Q4 and providing compensating current for the base circuit of transistor Q8. The invention thereby provides a useful and beneficial improvement in ignition systems.

What is claimed is:
1. In an ignition system for an internal combustion engine, the combination comprising:
   (a) first means driven by the engine for periodically generating a first signal;
   (b) second means driven by the engine for periodically generating a second signal;
   (c) means for selectively controlling the utilization of said first and second means in controlling ignition firing comprising, means for sensing the frequency of said first signal, means for causing said second means to control ignition firing so long as the frequency of said first signal is below a predetermined value which corresponds to an engine speed greater than engine cranking speed, means for transferring control of ignition firing from said second means to said first means when the frequency of said first signal attains said predetermined value, and means for transferring control of ignition firing back from said first means to said second means when the frequency of said first signal falls below a value which is less than said predetermined value and corresponds to an engine speed less than engine idle speed.

2. The combination of claim 1 wherein said first means comprises a transducer responsive to engine rotation and circuit means operably coupled with said transducer for generating said first signal.

3. The combination of claim 2 wherein said circuit means includes means for varying in accordance with selected engine operating conditions the engine crank angle at which said first signal is generated.

4. The combination of claim 1 wherein said second means comprises a transducer responsive to engine rotation and circuit means operably coupled with said transducer for generating said second signal.

5. The combination of claim 4 wherein said circuit means requires energization from a source of electrical potential in order to develop said second signal and wherein said circuit means is energized from a circuit operably coupled to said means for sensing the frequency of said first signal.

6. The combination of claim 5 wherein said ignition system includes electronic ignition control circuitry stages for controlling energization of an ignition coil and wherein said first signal is applied to the input stage of said electronic ignition control circuitry stages, but is prevented from controlling the energization of the ignition coil so long as said circuit means is being energized from said circuit operably coupled to said means for sensing the frequency of said first signal.

7. The combination of claim 6 wherein said first signal is prevented from controlling the energization of the ignition coil by an overriding signal supplied from said circuit operably coupled to said means for sensing the frequency of said first signal.

8. The combination of claim 1 wherein said first means comprises a first transducer and a first transducer circuit operably coupled thereto for developing said first signal, said second means comprises a second transducer and a second transducer circuit operably coupled thereto for developing said second signal, said second transducer circuit requiring energization from a source of electrical potential for generating said second signal, and wherein said means for selectively controlling the utilization of said first and second means in controlling ignition firing includes means for controllably energizing said second transducer circuit from said source of electrical potential to achieve the manner of operation of the structure recited in paragraph c.) of claim 1.

9. The combination of claim 8 wherein said means for selectively controlling the utilization of said first and second means comprises two transistors connected as a differential pair, an input circuit operatively associated with one transistor and coupled with said first means, an input circuit operatively associated with the second transistor of said pair and providing a predetermined reference representative of said predetermined value, means for switching the conductivity of the two transistors when the frequency of said first signal exceeds a frequency corresponding to said predetermined value, means for changing the reference supplied to the second transistor when the conductivity conditions of the two transistors switch so as to lower to said value which is less than said predetermined value the frequency of said first signal at which the conductivity conditions of the two transistors switch back to their original conditions and means responsive to the conductivity condition of one of the two transistors for selectively controlling the utilization of said first and second means in controlling ignition firing.

10. In a spark ignition system for an internal combustion engine, the combination comprising:
   first circuit means for producing a first spark firing signal at an engine crank angle which varies as a function of selected engine operating parameters;
   second circuit means for producing a second spark firing signal at a fixed engine crank angle;
   means for selectively utilizing one of said spark firing signals to the exclusion of the other in controlling spark ignition comprising, means for sensing the frequency of a selected one of said spark firing signals, means for causing said second spark firing signal to fire the ignition so long as the frequency of said selected one of said spark firing signals is below a predetermined value which corresponds to an engine speed greater than engine cranking speed, means for causing control of ignition firing to transfer from said second spark firing signal to said first spark firing signal when the frequency of said selected one of said spark firing signals attains said predetermined value, and means for causing control of ignition firing to transfer from said first spark firing signal to said second spark firing signal when the frequency of said selected one of said spark firing signals falls below a value which is less than said predetermined value and corresponds to an engine speed less than engine idle speed.

11. The combination of claim 10 wherein there are provided a first pick-up coil means operatively coupled with said first circuit means for providing an input signal for said first circuit means and a second pick-up coil means separate from said first pick-up coil means and operatively coupled with said second circuit means for providing an input signal for said second circuit means.

12. The combination of claim 10 wherein said means for sensing the frequency of a selected one of said spark firing signals senses the frequency of said first spark firing signal.

13. In an electronic engine control system for an internal combustion engine, the combination comprising:
first circuit means for producing a first signal at an engine crank angle which varies as a function of selected engine operating parameters;
second circuit means for producing a second signal at a fixed engine crank angle;
means for selectively utilizing one of said two signals to the exclusion of the other in controlling the engine comprising, means for sensing the frequency of a selected one of said two signals, means for causing said second signal to control the engine so long as the frequency of said selected one of said two signals is below a predetermined value which corresponds to an engine speed greater than engine cranking speed, means for causing control of the engine to transfer from said second signal to said first signal when the frequency of said selected one of said two signals attains said predetermined value, and means for causing control of the engine to transfer back from said first signal to said second signal when the frequency of said selected one of said two signals falls below a value which is less than said predetermined value and corresponds to an engine speed less than engine idle speed.

* * * * *